United States Patent [19]

Beysel et al.

[11] 4,428,372

[45] Jan. 31, 1984

[54] PROCESS AND APPARATUS FOR PROVIDING BREATHING GAS

[75] Inventors: Gerhard Beysel; Rudiger von Saldern, both of Wolfratshausen, Fed. Rep. of Germany

[73] Assignee: Linde Aktiengesellschaft, Wiesbaden, Fed. Rep. of Germany

[21] Appl. No.: 289,009

[22] Filed: Jul. 31, 1981

[30] Foreign Application Priority Data

Jul. 31, 1980 [DE] Fed. Rep. of Germany ....... 3029080

[51] Int. Cl.$^3$ .................. A62B 7/00; B01D 53/04
[52] U.S. Cl. .................. 128/202.26; 128/204.22; 128/205.12; 128/205.24; 128/205.26; 55/21; 55/25; 55/62; 55/179
[58] Field of Search ............ 128/202.26, 204.18, 128/205.12, 205.25, 205.26, 204.22, 205.24; 98/1.5; 55/62, 74, 179, 196, 21, 25, 26

[56] References Cited

U.S. PATENT DOCUMENTS

| | | | |
|---|---|---|---|
| 3,880,616 | 4/1975 | Myers et al. | 55/179 |
| 3,922,149 | 11/1975 | Ruder et al. | 55/21 |
| 4,160,651 | 7/1979 | Pivard | 55/62 |

*Primary Examiner*—Henry J. Recla
*Attorney, Agent, or Firm*—Millen & White

[57] ABSTRACT

A process and apparatus provides breathing gas for occupants of pressurized cabins, e.g., cabins in aircraft, by passing a compressed air through adsorbers for increasing the relative oxygen concentration thereof. The same apparatus is simultaneously employed for providing an emergency breathing gas supply stock. In normal operation, the supply from the adsorber is selectively switched to partially flow into an emergency storage tank for storing enriched oxygen breathing gas therein, and then switched back into supplying a total flow of the normal breathing gas for the occupants of the pressurized cabin. In the event of a system shut-down, the thus provided emergency storage tank is switched on to supply the emergency breathing gas.

20 Claims, 5 Drawing Figures

PROCESS AND APPARATUS FOR PROVIDING BREATHING GAS

BACKGROUND OF THE INVENTION

This invention relates to a process and apparatus for providing breathing gas for occupants of pressurized cabins in aircraft by the passing of air through adsorbers for increasing the oxygen concentration thereof.

Such a process is shown, for example, in DOS [German Unexamined Laid-Open Application] No. 2,837,281 wherein compressed air is conducted through an adsorber for increasing the oxygen concentration by means of the preferential adsorption of nitrogen on an appropriate adsorbent, and wherein the quantity of the gas flowing through the adsorber, the cycle time, the adsorption pressure, and the ratio of adsorption to desorption pressure are controlled for adjusting the oxygen concentration in a way such that it increases with an increase in flight altitude while simultaneously, the total amount of breathing gas (expressed in Normal liters or Nl) is reduced.

To overcome the difficulties attendant to the prior art breathing gas supply systems such as a cutoff of the air supply, e.g., by inactivation of the air conditioning system or a sudden pressure drop in the cabin due to a leak, an emergency supply of so-called high-altitude breathing oxygen is required in addition to the conventional systems supplied. The emergency supply is provided either by pressurized oxygen bottles or by the gasification of a liquid stock (see in this connection SAFE, 13th Annual Conference 1975, Advanced Aircraft Oxygen Systems, A. J. Aducci). The percentage of oxygen in the emergency supply generally consists of about 99.5% oxygen. However, these containers occupy a relatively large amount of space, especially in the restricted flight cabins normally found in military aircraft. Another problem is that these types of emergency supply systems require separate controls and servicing.

SUMMARY OF THE INVENTION

Therefore, an object of the invention is to provide a simple and reliable process and apparatus for supplying breathing gas thereby eliminating the need for conventional auxiliary devices used in providing an oxygen emergency supply.

Upon further study of the specification and appended claims, further objects and advantages of this invention will become apparent to those skilled in the art.

In accordance with the invention these objects are attained by producing an emergency supply of oxygen-rich breathing gas in the event of possible operational interruptions through the use of the same adsorbers employed for the normal operating conditions aircraft cabin air supply.

To accomplish this object, a breathing gas is made available for emergencies independently within the system for producing the normal breathing gas. More specifically, the process of this invention comprises the producing of an emergency supply of breathing gas of increased oxygen concentration (for example 95%) through the use of the same adsorbers which are also employed to produce the normal breathing gas.

As a result of the process of this invention, it is no longer necessary to provide separate maintenance for the emergency stock, and to include a separate control system. The supply of contained air provided from the ground is no longer necessary inasmuch as the emergency stock can be generated at almost any desired point in time. Thus, the emergency supply can be also provided in practically unlimited quantities for a variety of uses. The apparatus of this invention also provides the advantage that the emergency supply tank can be structurally integrated into the breathing gas supply system whereby very little additional space is required.

The primary feature of the invention resides in that an emergency stock of breathing gas is produced from the air by the same adsorbers which are used to generate the normal breathing gas. Therefore, no special system is required for providing an emergency supply of breathing gas. In this connection, the invention covers all types of adsorption techniques, including but not limited to adsorbers operated in a pressure swing or in a temperature swing mode; adsorption using purge gases and/or desorption agents; and adsorption methods wherein the enriched gas is obtained as a product gas or as a desorbed substance.

However, the pressure swing process offers advantages over the temperature swing mode, since adsorbers in this mode are generally operated essentially at a uniform temperature and thus, are very favorable from an energy consumption viewpoint. Furthermore, the pressure swing process provides the additional advantage of allowing a quick switchover of the adsorbers.

The apparatus for performing the process of the invention comprises a filter, a breathing gas generator comprised of several adsorbers, and a breathing gas outlet conduit, all the elements connected in series within the flow path of the air to be processed. An emergency storage tank is connected or taps into the breathing gas outlet conduit by means of a branch conduit.

The breathing gas generator comprises, for example, three reversible adsorbers, each filled with an adsorbent material capable of adsorbing either oxygen or nitrogen, preferably nitrogen, i.e., a zeolite-type molecular sieve.

The adsorbers are operated under the pressure swing method wherein the adsorption phase is followed by a regenerating phase, (pressure, expansion, and purging), and then a pressure buildup phase consisting of one or more pressure buildup stages.

According to one embodiment of the invention, a recharging step is conducted before the regenerating phase, during which two of the three adsorbers are respectively connected in series to the raw air source or supply; and the first of the two adsorbers, in the direction of the gas flow, is additionally charged with nitrogen as long as the $O_2$-concentration of the effluent is higher than in the air, thus resulting in a savings in consumption of adsorbent material. In this process, the first adsorber is fed with raw gas until a gas exits at the outlet end which contains, in addition to oxygen, a considerable amount of nitrogen. The oxygen and nitrogen containing gas enters the second adsorber and the nitrogen is adsorbed therein. Irrespective of whether either one adsorber or two adsorbers are connected in series for adsorption, the last adsorbing adsorber or adsorbers is operated until, depending on the cabin pressure at the end of each individual adsorption phase, a temporarily increasing proportion of nitrogen breaks through at the outlet end of the adsorber.

The permissible values for the oxygen concentration, dependent on the flight altitude and the resulting cabin pressure, are adjusted by controlling the amount of gas flowing through the adsorbers or the cycle time, the adsorption pressure, and/or the ratio of adsorption pressure to desorption pressure, e.g., constant adsorption pressure, whereas desorption occurs at the ambient external pressure at the respective flight altitude level. Thus, at a desorption pressure which decreases with respect to the adsorption pressure, the oxygen concentration increases as a result of a more complete regeneration of the adsorbers. In contrast thereto, an increase in the amount of gas flowing through the adsorber results in a reduction in oxygen concentration, because in this case, assuming the duration of the adsorption phase remains constant, the nitrogen breaks through to a greater extent.

According to another embodiment of the process of the invention, the emergency supply of breathing gas can be produced when the aircraft is standing on the ground, e.g., during the servicing of the aircraft. This provides the advantage that an emergency stock is made available from the initial moments of flight, and is available for immediate delivery as breathing gas if the normal breathing gas supply system fails.

The emergency stock can also be produced during flight; i.e., preferably under a higher adsorption pressure e.g., at about 10 bar, than required for producing the normal breathing gas. Under elevated pressure conditions, zeolite-type molecular sieves are capable of providing, at approximately ambient temperatures, a nitrogen adsorption which is increased relative to the oxygen amount, with the result that the gas exiting from the adsorber has an increased oxygen concentration. This is an advantage which is especially effective at relatively high flight altitudes, e.g., at least 5000 feet, where an increased oxygen concentration in the breathing gas is preferred. In addition, a greater amount of oxygen-enriched air can be stored at elevated pressure.

It is especially advantageous for this purpose to produce the emergency supply during portions of the flight wherein there is an increased engine power generation, e.g., while the aircraft is climbing, because the engine yields the compression energy for the air to be purified and separated and thus, the air to be purified is compressed to a greater degree to produce a higher pressure in the adsorber leading to a relatively increased adsorption of nitrogen and thus, to a higher oxygen concentration in the product gas. Preferably, oxygen-enriched air for (a) the breathing gas and (b) for the emergency supply is simultaneously withdrawn from the adsorbers in this process. The breathing gas generated then contains, for a short time, that increased oxygen concentration preferred for filling the emergency reservoir with breathing gas.

In this connection, it is advantageous if the emergency storage tank is charged with an adsorbent for oxygen. When using a zeolite-type molecular sieve, e.g., a type 4A or 5A, it is possible to store a greater amount, normally three to four times the amount, of breathing gas in the emergency storage tank than in an emergency tank without an adsorbent therein.

In the case when the adsorbers produce a breathing gas having a temporarily fluctuating composition, provision is made, according to another embodiment of the process, to branch off a portion of breathing gas for the emergency supply only if the gas has an oxygen content higher than that required for the normal breathing gas preferably higher than e.g. 80%. This can occur, for example, during short-term pressure fluctuations as well as during normal operation of the adsorbers, because the oxygen concentration within each adsorption phase ranges initially from a higher value toward a lower value. In view of the concentration fluctuation, it may be advantageous, at least until the amount of high-altitude breathing oxygen required for the emergency supply has been made available, to sense $O_2$ concentration e.g. by means of the fast $O_2$-partial pressure sensor described in Technological News, Spring 1980, pp 5–9 to feed the fractions high in oxygen content which are initially discharged during a newly begun adsorption cycle, to the emergency stock by means of a suitable switching of the valves. Thus, only the subsequently provided fractions, which are richer in nitrogen, are supplied as the normal breathing gas.

According to another embodiment, the process is operated with at least two adsorbers in the pressure buildup phase to produce the emergency supply. The pressure in this adsorber must, for this purpose, be higher than that in the emergency supply tank so that breathing gas for the emergency stock can be delivered only toward the end of the pressure buildup phase.

The apparatus of this invention provides special advantages if the adsorbers of the breathing gas generator are disposed within an emergency storage tank, and the inner space between the outside walls of the adsorbers and the wall of the emergency storage tank is charged with an adsorbent for oxygen. By arranging the emergency storage tank in this way there is a savings in space and the installation into an aircraft is facilitated by the compactness of the system.

BRIEF DESCRIPTION OF THE DRAWINGS

Other objects and advantages of the invention will become more readily apparent from the detailed description of the invention made with reference to the accompanying drawings in which.

DETAILED DISCUSSION OF THE INVENTION

Figure 1:
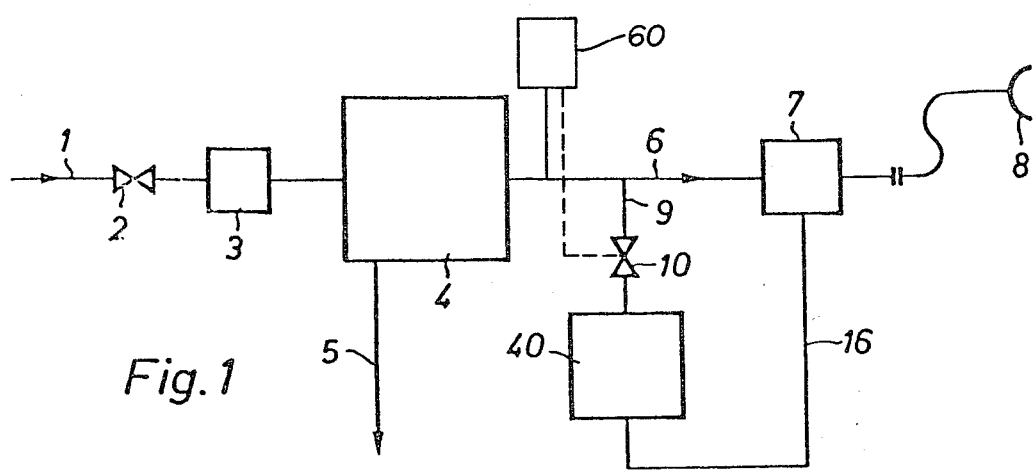
FIG. 1 is a schematic diagram of the preferred embodiment of the apparatus for performing the process of the invention.

In FIG. 1, compressed air, maintained at a constant temperature of 20° C., for example, in an air conditioning system which is not illustrated, passes through a conduit 1 and a control valve 2 maintaining the air stream at about 10 bar, into a filter 3. In the filter 3, any impurities present, such as moisture droplets or solid particles, are recovered. The purified air then flows into a breathing gas generator 4, e.g., an adsorption device having three reversible adsorbers operated in a pressure alternation mode according to the process described hereinabove. The cycle period of the adsorption device is, in the present case, 12 seconds. The desorption gas and the purge gas is withdrawn through a conduit 5. The oxygen-enriched breathing gas passes through a conduit 6 into a regulating device 7 for regulating the demand for breathing gas. The regulating device, under normal operation, is connected so that the breathing gas passes directly into a respiratory mask 8 and, when a person using the mask inhales, into the lungs of said person.

The emergency supply of breathing gas, preferably consisting for example, of at least 95% oxygen, although the concentration of oxygen can vary between 60% and 95% and still be effective as an emergency supply, is generated in the following way:

By increasing engine power, the air to be processed is passed into the adsorbers under a relatively elevated pressure so that in these adsorbers, the higher pressure will produce a breathing gas having an increased oxygen concentration between 60% and 95%, suitable for use as the emergency supply. The breathing gas exits from the breathing gas generator 4 through a conduit 6 and is fed, as described above, into the respiratory mask 8. The breathing gas is sensed by a sensor 60, located, for example, as shown in FIG. 1 at the outlet of breathing gas generator 4, which senses $O_2$ concentration and upon the oxygen concentration falling between 60% and 95%, controls valve 10 so that a portion of the breathing gas is branched off from the conduit 6 through a branch conduit 9 and passes through the charging valve 10 into an emergency storage tank 40. The charging valve 10 is closed once the emergency storage tank 40 is filled up.

In case of an interruption in operation, breathing gas passes from the emergency storage tank 40 through a conduit 16 into the regulating device 7 for regulating the breathing gas demand. The regulating device 7 shuts-off conduit 6 at this time and thus, allows the emergency breathing gas to pass therethrough into the respiratory mask 8.

Figure 2:
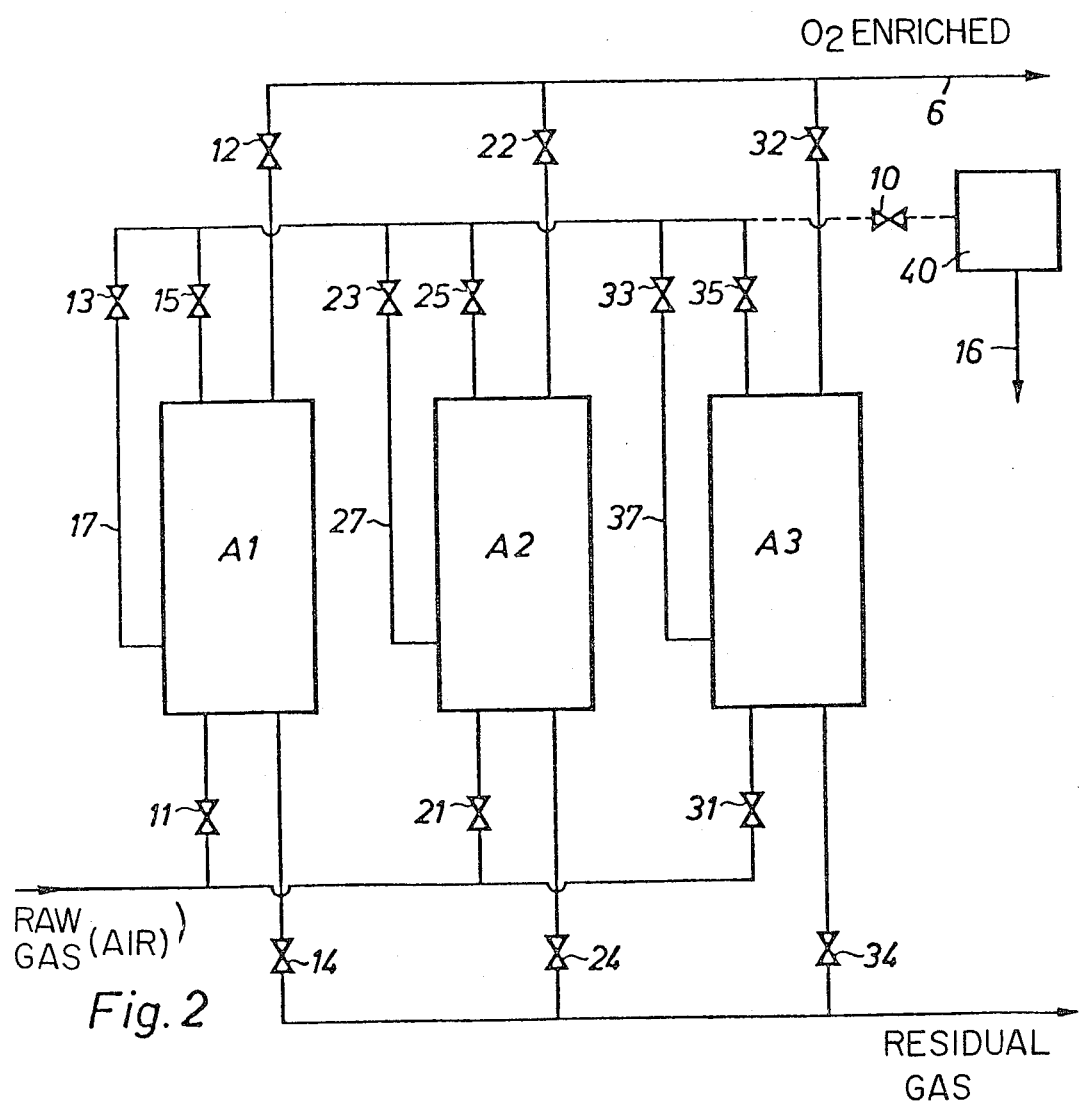
FIG. 2 is a schematic diagram of the preferred embodiment of the adsorbing system of the invention having three adsorbers.

FIG. 2 shows an embodiment of a cyclically operating adsorber installation wherein the emergency reservoir can be easily charged and discharged. In this arrangement, the following initial switching operation is performed: adsorber A1 delivers the product gas, adsorber A2 is regenerated, and adsorber A3 is in the pressure buildup phase.

Air compressed to 10 bar (for example 200 Nl/min) flows through the opened valve 11 into the adsorber A1. In the adsorber A1, nitrogen is preferentially adsorbed before oxygen, for example by a zeolite-type molecular sieve, e.g., a type 5A. The adsorber A1 is charged with e.g. 2.5 liters of molecular sieve.

During the first adsorption phase in adsorber A1, a gas highly enriched in oxygen is conducted through the opened valves 15 and 10 into the emergency storage tank 40. Subsequently, the valves 15 and 10 are closed, and normal breathing gas passes during the second adsorption phase through valve 12 and conduit 6 into the regulating device 7 (not shown) for regulating the breathing gas demand.

At the conclusion of the adsorption phase in adsorber A1, the valves 11 and 12 are closed, and air passes through valve 31 into adsorber A3. At the same time, the valves 15 and 23 between the adsorbers A1 and A2 are opened to provide a pressure equilization between the adsorbers.

After pressure equilization has been accomplished, which need not be a complete equilization, the valves 15 and 23 are again closed, and valve 14 is opened, i.e., at this time the adsorber A1 is being regenerated. For this purpose, residual gas is discharged through valve 14 and, to improve desorption, a portion of the breathing gas from adsorber A3 is passed through valve 35 and valve 15 (again opened) for flushing the adsorber A1, and discharged through valve 14. After the lowest pressure level is reached in adsorber A1, the valve 14 is closed and the regenerating phase is terminated.

At this point, adsorber A3 is pressure equalized through the opened valves 35 and 13. After adsorber A3 is pressure equalized, the valves 35 and 13 are again closed. Valve 11 is opened, and compressed air passes into adsorber A1 to build up the pressure therein to attain the necessary adsorption pressure. In the first adsorption phase, the valves 15 and 10 are then opened again so that oxygen-enriched gas can pass into the emergency storage tank 40 while, in the second adsorption phase, the valves 15 and 10 are closed and valve 12 is opened, and breathing gas is conducted through valve 12 and conduit 6, through the regulating device 7 into the mask 8.

While adsorber A1 is in the adsorption phase, adsorber A2 is in the regenerating phase, consisting of releasing pressure through valve 24 and flushing through valves 15 and 25, a pressure buildup takes place in adsorber A3 simultaneously to the two stages as described above.

If the normal breathing gas supply is discontinued breathing gas can be withdrawn from the emergency storage tank 40 by way of conduit 16.

The consumption of breathing gas under normal conditions on the ground changes from 20 Nl/min per person to 12 Nl/min per person at an altitude of 15,000 feet. Assuming that the emergency supply is designed to last for 10 minutes at the altitude of 15,000 feet, 120 Nl of breathing air of about 95% oxygen must be made available. However, this quantity is introduced in the emergency storage tank under a pressure of 10 bar, so that the tank needs only contain 12 l. If the emergency storage tank is additionally filled with a zeolite-type molecular sieve, the required volume of the emergency storage tank is reduced to about 3 l.

Figure 3:
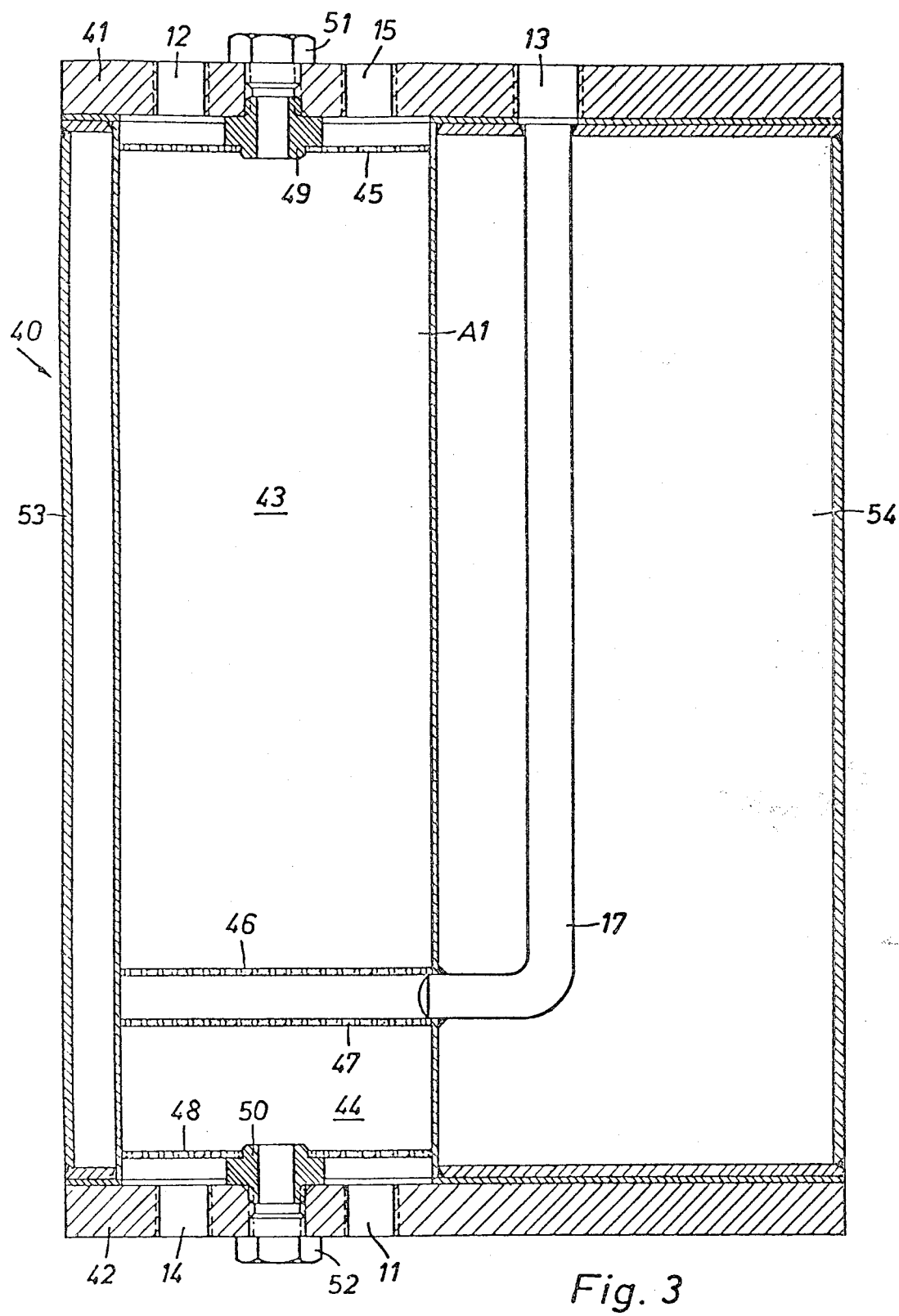
FIG. 3 is a longitudinal cross-section view of an emergency storage tank employed in the invention having three adsorbers installed therein.
Figure 4:
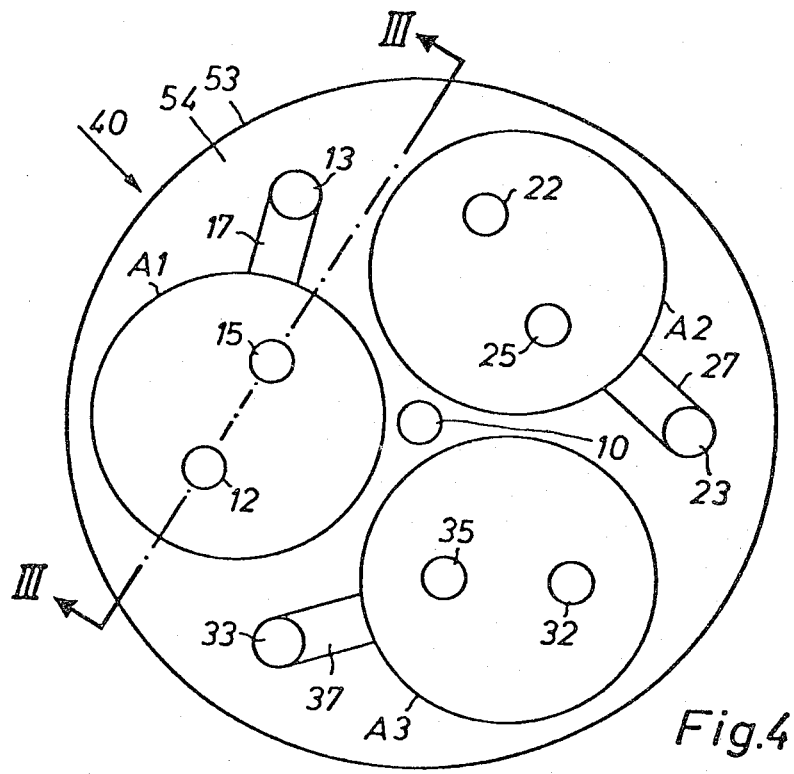
FIG. 4 is a top plan view of the emergency storage tank having adsorbers as shown in FIG. 3.

FIG. 3 shows the emergency storage tank 40 with the three adsorbers installed, in a sectional view along line III—III of FIG. 4, so that only adsorber A1 is visible. The adsorber A1 is welded in place between the top and bottom panels 41 and 42, respectively. The two adsorption chambers 43 and 44 are defined at the top and bottom respectively by screen plates 45 and 46, and 47 and 48. The plates 48 and 45 include connecting passages 49 and 50. The passages 49 and 50 are sealed with threaded plugs 51 and 52, which simultaneously serve as spacers for the upper and lower screen plates 45 and 48, respectively.

If adsorber A1 is in the second part of the adsorption phase, the air to be separated enters through valve 11, and the product is discharged through valve 12 as shown in FIG. 2. After completion of the adsorption phase, a pressure equalization takes place through valve 13 and conduit 17, also as shown in FIG. 2, with the adsorber A3, (not shown in FIG. 3). For this purpose, the screen plates 46 and 47 connected to the conduit 17 are provided, and thus the plates 46 and 47 provide gas exchange to the adsorption chambers 43 and 44. After pressure equalization, the valve 13 is closed and residual gas is discharged through valve 14.

The emergency supply of breathing gas is stored in the inner space 54 remaining between the wall 53 of the tank and the adsorbers. The inner space 54 can, in a preferred embodiment be charged with an oxygen-adsorbing agent. The oxygen-rich breathing gas passes into the space 54 through the valve 10, not illustrated in FIG. 3, and through a conduit, likewise not illustrated in this figure, arranged between the valves 15 and 10.

The emergency supply is withdrawn through conduit 16 shown in FIG. 2.

FIG. 4 is a top plan view of the emergency storage tank 40, the three adsorbers A1, A2 and A3 installed in the tank. The corresponding valves and pressure equalization pipes illustrated correspond to those shown in FIGS. 2 and 3. The valves can be arranged individually as shown, or they may comprise a rotary slide valve.

Figure 5:
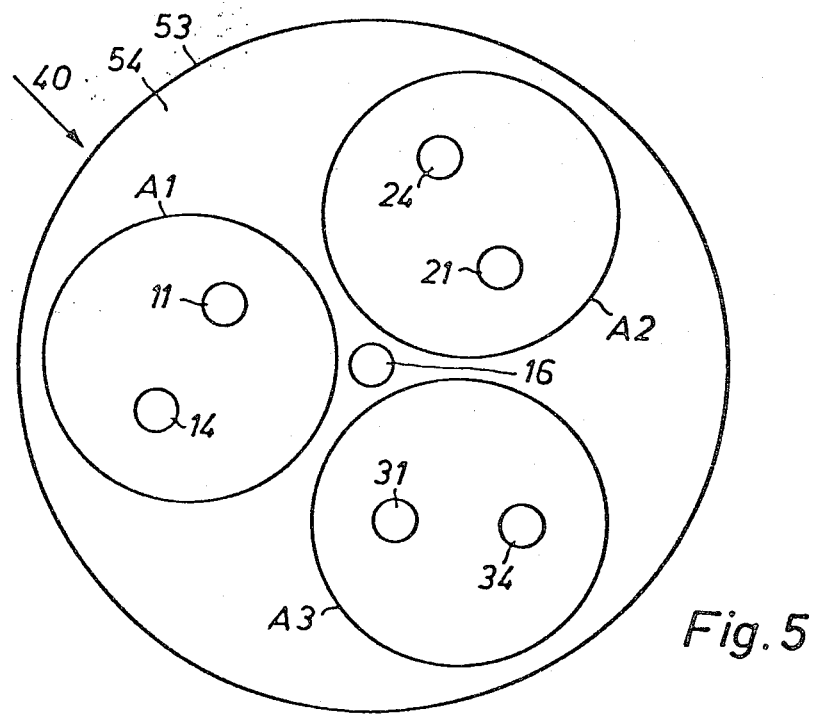
FIG. 5 is a bottom plan view of the emergency storage tank having adsorbers as shown in FIG. 3.

FIG. 5 is a bottom plan view of the same emergency storage tank 40. The corresponding valves and also the conduit 16 for removal of the breathing gas are also illustrated.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for providing breathing gas for occupants of pressurized cabins in aircraft wherein said breathing gas is normally provided by passing air through adsorbers in aircraft for increasing the oxygen concentration of the air, the improvement comprising:
   withdrawing a portion of the oxygen-enriched breathing gas from said adsorbers and storing said portion of oxygen enriched breathing gas as an emergency supply of breathing gas for consumption only in the event of an interruption of the normal breathing gas supply.

2. An apparatus for providing breathing gas to occupants of pressurized cabins in aircraft by the enrichment of oxygen in adsorbers in the aircraft, comprising a plurality of elements connected in series for providing a flow path for the air to be processed, and said plurality of elements comprising: a filter (3); a breathing gas generator (4), including plural adsorbers, connected to said filter (3); a breathing gas outlet conduit (6) connected to said breathing gas generator (4); and an emergency storage tank (40) connected to the breathing gas outlet conduit (6) by means of a branch conduit (9), with said emergency storage tank having means associated therewith such that breathing gas is fed thereto through said branch conduit (9) only when breathing gas produced by said breathing gas generator (4) exceeds a predetermined minimum O₂ concentration, and means adapted to supply breathing gas stored therein only upon an interruption of the breathing gas supply from said breathing gas generator (4).

3. In a process for providing breathing gas for occupants of pressurized cabins in aircraft wherein said breathing gas is normally provided by passing air through adsorbers in the aircraft for increasing the oxygen concentration of the air, the improvement comprising:
   withdrawing a portion of the oxygen-enriched breathing gas from said adsorbers and storing said portion of oxygen enriched breathing gas as an emergency supply of breathing gas for consumption in the event of an interruption of the normal breathing gas supply, and wherein said withdrawing step is conducted by monitoring the fluctuating composition of the breathing gas, and branching off the position of the flow into the emergency supply when the gas exiting from the adsorbers has an oxygen concentration greater than the oxygen concentration normally required for breathing gas.

4. A process according to claim 3, comprising producing said emergency supply of breathing gas when the aircraft is on the ground.

5. A process according to claim 3, comprising producing said emergency supply of breathing gas when the aircraft is in flight.

6. A process according to claims 3, 2 or 5 further comprising producing the emergency supply of breathing gas in the adsorbers under a higher adsorption pressure than the adsorption pressure during production of the breathing gas used for normal operating conditions aircraft cabin air supply.

7. A process according to claim 6, further comprising producing said emergency supply of breathing gas during periods of flight wherein engine power output is increased.

8. A process according to claims 3 or 2, further comprising simultaneously withdrawing both the oxygen-enriched air for the breathing gas and for the emergency supply from the adsorbers.

9. A process according to claim 3, comprising producing breathing gas in an installation comprising at least two adsorbers arranged in succession, said at least two adsorbers cyclically interchanged and each one passing respectively through the phases of adsorption, desorption, and pressure buildup.

10. A process according to claims 3 or 8, comprising producing the emergency supply during the pressure buildup phase of each of the adsorbers.

11. A process according to claims 3 or 8, comprising performing the adsorption phase through two adsorbers connected in series.

12. A process according to claim 3, wherein said portion of oxygen-enriched breathing gas withdrawn for storage as said emergency supply is enriched to about a 95% concentration of oxygen.

13. A process according to claim 3, wherein said withdrawing step is conducted when the oxygen concentration of the oxygen-enriched breathing gas produced is at least 60%.

14. A process according to claim 13, wherein said withdrawing step is conducted when the oxygen concentration of the oxygen-enriched breathing gas produced is between 60% and 95%.

15. A process according to claim 3 further comprising supplying the stored oxygen-enriched breathing gas as an emergency supply of breathing gas for consumption when the supply of breathing gas provided as breathing gas used for normal operating conditions aircraft cabin air supply is interrupted.

16. An apparatus for providing breathing gas to occupants of pressurized cabins in aircraft by the enrichment of oxygen in adsorbers in the aircraft, comprising a plurality of elements in series for providing a flow path for the air to be processed, and said plurality of elements comprising:
   a filter (3); a breathing gas generator (4), including plural adsorbers, connected to said filter (3); a breathing gas outlet conduit (6) connected to said breathing gas generator; an emergency storage tank (40) connected to the breathing gas outlet conduit (6) by means of a branch conduit (9); branch conduit valve means (10) arranged in branch conduit (9); oxygen concentration sensing means associated with said breathing gas outlet conduit (6) and said branch conduit valve means (10); and said branch conduit valve means (10) adapted for opening to direct a partial flow of gas produced by said breathing gas generator (4) to said emergency storage tank (40) when said oxygen concentration sensing means senses a minimum oxygen concentration of the gas produced by said breathing gas generator of at least about 60%.

17. An apparatus according to claim 16, further comprising a regulating device (7) for regulating the demand of breathing air connected into the breathing gas outlet conduit (6), and at least one respiratory mask (8) connected to the regulating device (7), said emergency storage tank (40) being connected to the regulating device (7) for regulating the demand of breathing air by means of a conduit (16), whereby upon an interruption in operation of said breathing gas generator (4), said regulating device (7) connects said emergency storage tank (40) to said respiratory mask (8) to supply breathing gas thereto.

18. An apparatus according to claims 16 or 13, wherein said emergency storage tank (40) comprises an adsorbent contained therein capable of adsorbing oxygen.

19. An apparatus according to claims 16 or 13, wherein said plurality of adsorbers comprises three adsorbers (A1, A2, A3) arranged within the emergency storage tank (40).

20. An apparatus according to claim 19, wherein said adsorbers ($A_1$, $A_2$, $A_3$) have outer walls, and said emergency storage tank (40) includes an inner space (54) defined between the outer walls of said adsorbers (A1, A2, A3), and the inside of the wall of the emergency storage tank (40) and wherein said inner space (54) is charged with an adsorbent for adsorbing oxygen.

* * * * *